2,815,386
3,7,9-TRIMETHYL-2,6-DECADIEN-1-AL

Joseph Donald Surmatis, Pompton Plains, N. J., assignor to Hoffmann-La Roche Inc., Nutley, N. J., a corporation of New Jersey No Drawing. Application May 4, 1955,
Serial No. 506,079

1 Claim. (Cl. 260—601)

This invention relates to novel chemical compounds having utility in the perfume industry, for example, as odor imparting agents; and to novel intermediates and novel processes useful in preparing said compounds. More particularly, the invention provides three novel compounds identified herein as 3,7,9-trimethyl-2,6-decadien-1-al, 4 - (6 - isobutyl-2,6-dimethyl-2-cyclohexen-1-yl)-3-buten-2-one and 4-(6-isobutyl-2,6-dimethyl-1-cyclohexen-1-yl)-3-buten-2-one. These novel compounds possess characteristic fragrances, and are useful in compounding perfumes and other scented compositions, in order to impart their fragrances to said compositions.

In one comprehensive embodiment, the invention provides a process for converting 3,7,9-trimethyl-1,6-decadien-3-ol to the novel compounds identified above which comprises the steps of oxidizing 3,7,9-trimethyl-1,6-decadien-3-ol thereby producing 3,7,9-trimethyl-2,6-decadien-1-al, condensing the latter with acetone thereby producing 6,10,12-trimethyl-3,5,9-tridecatrien-2-one, and cyclizing the latter thereby producing a 4-(6-isobutyl-2,6-dimethyl-cyclohexen-1-yl)-3-buten-2-one.

A preferred method of effecting the comprehensive process recited above comprises the steps of treating 3,7,9-trimethyl-1,6-decadien-3-ol with chromic acid at a moderately elevated temperature between about 35° C. and about 50° C., thereby producing 3,7,9-trimethyl-2,6-decadien-1-al, condensing the latter with acetone (for example, by treating with acetone in the presence of a condensation agent such as an alkali metal hydroxide or an alkali metal alkoxide or an aluminum alkoxide) thereby producing 6,10,12-trimethyl-3,5,9-tridecatrien-2-one, and cyclizing the latter by treating with a strong mineral acid. If the cyclization is effected by the use of a sulfuric acid cyclizing agent (e. g. a mixture of concentrated sulfuric acid and glacial acetic acid) at a temperature below about 0° C., the product is 4-(6-isobutyl-2,6-dimethyl-1-cyclohexen-1-yl)-3-buten-2-one. However, if the cyclization is effected by using a syrupy aqueous phosphoric acid cyclization agent (e. g. aqueous phosphoric acid containing 85% by weight $H_3PO_4$) at moderately elevated temperatures, i. e. between about 20° C. and about 50° C., the product is 4-(6-isobutyl-2,6-dimethyl-2-cyclohexen-1-yl)-3-buten-2-one.

The starting material of the comprehensive process disclosed above is itself a novel compound. In order that the disclosure herein may be complete, the method of preparing this starting material is described below.

PREPARATION OF 3,7,9-TRIMETHYL-1,6-DECADIEN-3-OL 438 grams of 3,5-dimethyl-1-hexen-3-ol was stirred with 1500 cc. of concentrated aqueous hydrochloric acid (37% by weight HCl concentration) at room temperature for 30 minutes. The oil layer was separated, washed twice, each time with 500 cc. of water, and dried over calcium chloride. The product obtained, 1-chloro-3,5-dimethyl-2-hexene, had $n_D^{25} = 1.448$.

In a five-liter flask there was placed three liters of benzene, 429 g. of ethyl acetoacetate and 162 g. of sodium methylate. 428 g. of 1-chloro-3,5-dimethyl-2-hexene was added at 60° C. within 30 minutes, and stirring was continued for six hours at 60–70° C. The reaction mixture was washed with two liters of water and the benzene was distilled off under a vacuum of 100 mm. to yield 3-carbethoxy-6,8-dimethyl-5-nonen-2-one as a straw-colored oil.

The entire quantity of 3-carbethoxy-6,8-dimethyl-5-nonen-2-one produced as described in the preceding paragraph was dissolved in 2 liters of ethyl alcohol. To this was added 200 g. of solid potassium hydroxide and 200 cc. of water. The mixture was stirred for 4 hours at 40–50° C. To the resulting solution of the potassium salt of 3-carboxy-6,8-dimethyl-5-nonen-2-one was then added concentrated aqueous hydrochloric acid (37% by weight HCl) from a separatory funnel until the solution was strongly acid. Thirty minutes were required for the addition. The solution was then stirred an additional hour at 50° C.

The reaction mixture was diluted with two liters of water and the oil layer was removed by means of a separatory funnel. The aqueous portion was extracted with 500 cc. of benzene. The combined oils were washed neutral with water and fractionated. The product 6,8-dimethyl-5-nonen-2-one distilled at 120° C. at 35 mm., $n_D^{25} = 1.4432$. The 2,4-dinitrophenylhydrazone derivative melted at 47° C. The semicarbazone derivative melted at 114° C.

In 1.5 liters of liquid ammonia there was dissolved 41.4 g. of metallic sodium. Acetylene gas was passed into the blue colored solution, until the color changed to white. The addition of acetylene was continued for an extra 30 minutes. Then a solution of 252 g. of 6,8-dimethyl-5-nonen-2-one, dissolved in 250 cc. of diethyl ether, was dropped in within 45 minutes. The stirring was continued for fifteen hours while a slow stream of acetylene was bubbled into the reaction mixture.

The ammonia was thereupon evaporated from the reaction mixture with the aid of a slow stream of nitrogen. The residue was poured into two liters of aqueous 5% sulfuric acid. The oil layer was removed and washed neutral with water. On fractionation, 3,7,9-trimethyl-1-decyn-6-en-3-ol was obtained in a fraction distilling at 72° C. at 0.35 mm., $n_D^{25} = 1.4598$.

189 g. of 3,7,9-trimethyl-1-decyn-6-en-3-ol was diluted with an equal volume of petroleum ether and placed in a flask with 18.9 g. of 5% lead-palladium-on-calcium carbonate catalyst [Lindlar, Helvetica Chimica Acta 35, 450 (1952)]. This was hydrogenated at one atmosphere gauge hydrogen pressure until 0.97 mol of hydrogen was consumed. On fractionation of the reaction mixture, there was obtained 3,7,9-trimethyl-1,6-decadien-3-ol, distilling at 129° C. at 20 mm., $n_D^{25} = 1.4592$.

Certain of the compounds of the invention are capable of exhibiting optical isomerism and geometric isomerism. It should be understood that the invention includes all of the stereoisomeric forms of the novel compounds herein described and claimed, and is limited only by the claims.

The invention is further disclosed in the following examples, which are illustrative but not limitative thereof.

Example 1

In a 12 liter flask, which was provided with a thermometer, stirrer and a cooling bath, there were placed 3000 cc. of water, 250 cc. of glacial acetic acid, 500 g. of potassium dichromate and 400 cc. of benzene. The mixture was stirred until the potassium dichromate was all dissolved, then 318 g. of 3,7,9-trimethyl-1,6-decadien- 3-ol was added all in one portion. 220 cc. of concentrated sulfuric acid was added to 800 cc. of cold water and the entire amount of the diluted acid was charged to a dropping funnel and added to the stirred reaction mixture in 2 hours. During the addition of the acid, the temperature was kept below 40° C. The stirring was continued for an additional 90 minutes. The oil layer was then separated, and the aqueous layer was extracted with one liter of benzene. The combined oil and benzene extracts were water washed, and dried over anhydrous calcium sulfate. On fractionation there was obtained 3,7,9-trimethyl-2,6-decadien-1-al, distilling at 80°–81° C./0.2 mm., $n_D^{25}=1.479$. This product has an odor reminiscent of lemons, but with a waxy note; and is useful in compounding perfume oils of the citrus type, e. g. lemon and bergamot.

Example 2

125 g. of 3,7,9-trimethyl-2,6-decadien-1-al and 400 g. of acetone were cooled to minus 10° C. while stirring under a blanket of nitrogen. A solution of 4.6 g. of sodium dissolved in 100 cc. of absolute ethanol was stirred into the reaction mixture in 12 minutes while maintaining the temperature at minus 6° to minus 8° C. The mixture was stirred 4 minutes longer at minus 6° C., then it was neutralized with a 10% by weight aqueous solution of acetic acid. The reaction mixture was diluted with 1 liter of water and extracted with 500 cc. of benzene. The benzene extract was water washed and dried over anhydrous calcium sulfate. After removing the benzene, the residue was fractionated under high vacuum. The fraction distilling at 114–118° C./0.2 mm., $n_D^{25}=1.511$–1.515, was 6,10,12-trimethyl-3,5,9-tridecatrien-2-one.

Example 3

100 g. of 3,7,9-trimethyl-2,6-decadien-1-al, 300 g. of acetone and 40 cc. of water were placed in a flask and while stirring under nitrogen, there was added 18 g. of a 50% aqueous solution of sodium hydroxide. The mixture was stirred for 76 hours under nitrogen, while the temperature was maintained at 16° to 18° C. The reaction mixture was neutralized with 20% by weight aqueous sulfuric acid at minus 5° C., then extracted with benzene. The benzene extract was water washed and dried over anhydrous calcium sulfate. On fractionation, 6,10,12-trimethyl-3,5,9-tridecatrien-2-one was obtained in the fraction distilling at 114°–118° C./0.2 mm., $n_D^{25}=1.511$–1.515.

Example 4

91 g. of 3,7,9-trimethyl-2,6-decadien-1-al, 97 g. of aluminum isopropylate, 970 cc. of acetone and 970 cc. of benzene were placed in a 5 liter flask and refluxed for 24 hours under nitrogen. The reaction mixture was then cooled and neutralized with a solution of 140 cc. of concentrated hydrochloric acid and 560 cc. of water. The mixture was extracted with two 200 cc. portions of benzene, the combined extracts were dried over anhydrous calcium sulfate and fractionated. The fraction distilling at 114°–118° C./0.2 mm., $n_D^{25}=1.511$–1.515 was 6,10,12-trimethyl-3,5,9-tridecatrien-2-one.

Example 5

94.6 g. of refractionated 6,10,12-trimethyl-3,5,9-tridecatrien-2-one, B. P. 104° C./0.1 mm., $n_D^{25}=1.515$ were added to 580 cc. syrupy aqueous phosphoric acid (85% by weight $H_3PO_4$) during 30 minutes, at a temperature maintained between 24° and 30° C. The stirring was continued 5 minutes longer at 30° C. The mixture was then poured into 2.2 liters of ice water. The upper layer was separated, and the aqueous layer was extracted twice, each time with 500 cc. of benzene. The benzene solution was water washed until neutral. The crude reaction product was distilled with steam, the upper (organic) layer of the distillate was separated and the aqueous (lower) layer was extracted with 100 cc. of benzene. The organic layer and the benzene extract were combined and the benzene was removed under reduced pressure. The residue was fractionated under high vacuum. The fraction distilling at 94–97° C./0.2 mm.

$$n_D^{25}=1.4958-1.4963$$

was 4-(6-isobutyl-2,6-dimethyl-2-cyclohexen-1-yl)-3-buten-2-one. This product has a penetrating woody odor reminiscent of cedarwood and sandalwood, and is useful as an odoriferant in the preparation of perfumes.

Example 6

A solution of 700 g. of concentrated sulfuric acid and 150 g. of glacial acetic acid was cooled to minus 30° C. Then 234 g. of refractionated 6,10,12-trimethyl-3,5,9-tridecatrien-2-one, B. P. 104° C./0.1 mm., $n_D^{25}=1.515$, was added during 45 minutes, the temperature being kept between minus 30° C. and minus 20° C. An efficient powerful stirrer was needed as the solution became very thick.

The mixture was warmed up to 0° C. and stirred for 10 minutes at that temperature. It was then poured onto 3000 g. of crushed ice and allowed to stand until the ice melted. The organic layer was separated, and the aqueous layer was extracted with toluene. The organic layer and the toluene extract were combined and washed with 500 cc. of water, 500 cc. of 20% aqueous sodium hydroxide solution and finally with 500 cc. of a saturated aqueous sodium chloride solution containing a little acetic acid. The oil was dried over anhydrous calcium sulfate, the solvent was removed and the residue was fractionated. The fraction distilling at 92° C./0.3 mm.

$$n_D^{25}=1.505-1.507$$

comprised essentially 4-(6-isobutyl-2,6-dimethyl-1-cyclohexen-1-yl)-3-buten-2-one. This compound has an odor similar to that of 4-(6-isobutyl-2,6-dimethyl-2-cyclohexen-1-yl)-3-buten-2-one, but distinguishable from the odor of the latter in being not quite so woody and in having leafy green accents. The compound is useful as an odoriferant in the preparation of scented compositions.

I claim:

3,7,9-trimethyl-2,6-decadien-1-al.

References Cited in the file of this patent

UNITED STATES PATENTS

| | | |
|---|---|---|
| 1,891,043 | Diels et al. | Dec. 13, 1932 |
| 2,200,216 | Loewenberg et al. | May 7, 1940 |
| 2,265,211 | Waibel et al. | Dec. 9, 1941 |
| 2,589,275 | Naves | Mar. 18, 1952 |
| 2,606,930 | Heilbron et al. | Aug. 12, 1952 |